UNITED STATES PATENT OFFICE.

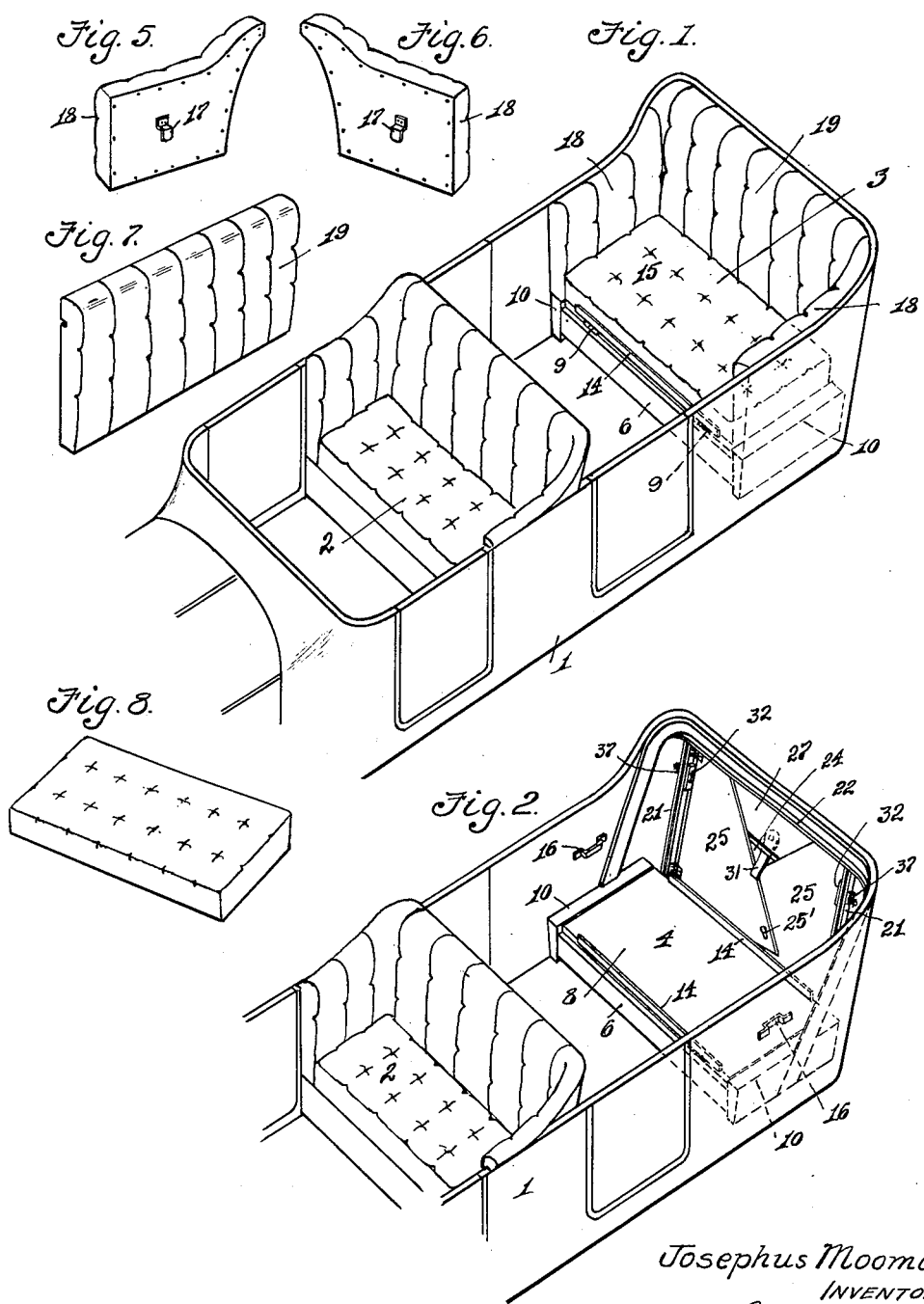

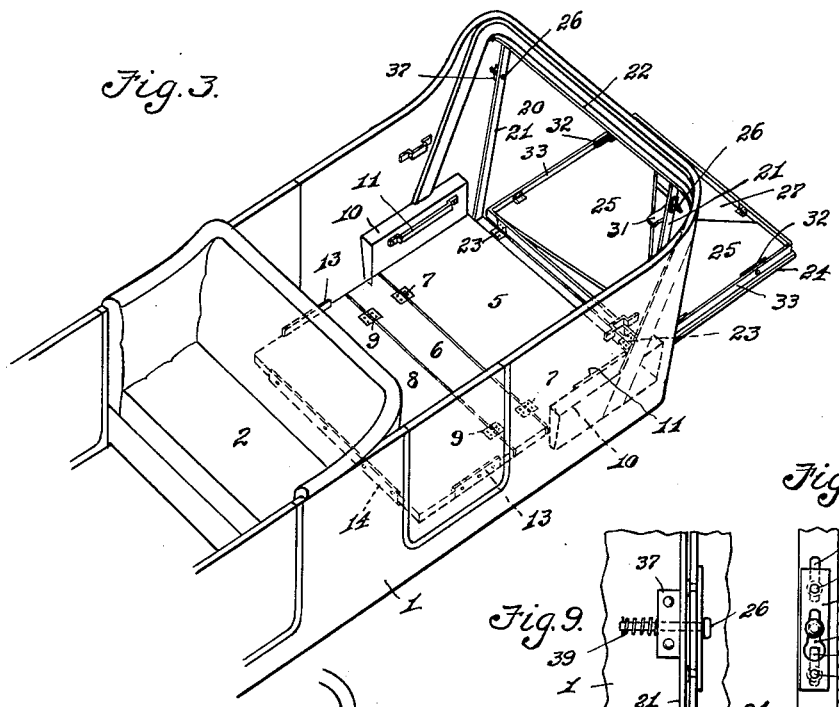

JOSEPHUS MOOMAW, OF SOUTH BEND, INDIANA.

CONVERTIBLE AUTOMOBILE-BODY.

1,287,394.                    Specification of Letters Patent.     Patented Dec. 10, 1918.

Application filed May 23, 1918. Serial No. 236,222.

*To all whom it may concern:*

Be it known that I, JOSEPHUS MOOMAW, a citizen of the United States, residing at South Bend, in the county of St. Joseph and State of Indiana, have invented certain new and useful Improvements in Convertible Automobile-Bodies, of which the following is a specification.

My invention relates to improvements in convertible automobile bodies adapted for either pleasure or for trucking purposes, and which is so constructed and arranged that it may be easily and quickly converted so as to be adapted for either use.

The primary object of the invention resides in the provision of a two seated automobile body, commonly termed a touring body, which is so constructed and arranged that the tonneau can be used for hauling goods by providing removable rear seat cushions, and a collapsible seat platform composed of sections adapted to be disposed flat upon the floor of the body, so as in effect to provide a super or double flooring, in which position the seat platform will occupy a minimum of space and practically the full capacity of the tonneau will be available for trucking purposes. A further object resides in providing the rear end of the body with an opening, and a drop panel forming a closure therefor, which panel when lowered to operative position forms an extension of the body floor or platform, and thus materially increases the load capacity of the body. An important feature of the invention consists in so constructing and arranging the convertible parts of the body so that none of the parts, with the exception of the seat cushions, need be removed in converting same from a touring to a truck body, and that when arranged as a touring body the same will have the conventional lines of that type of body, and its convertibility not easily recognized.

With the above and other objects in view, the invention in the preferred form of details will be described in the following specification, reference being had particularly to the accompanying drawings, in which:

Figure 1 is a perspective view showing my improved body arranged for passenger use.

Fig. 2 is a similar view showing the rear seat cushions removed preliminary to unfolding the seat.

Fig. 3 is a similar view showing the body partly converted for trucking purposes.

Fig. 4 is a similar view showing the body fully converted for trucking purposes.

Figs. 5, 6, 7 and 8 show the respective end, back and seat cushion in separate relation.

Figs. 9 and 10 show in side and edge elevation respectively the locking means and manner of locking the drop panel in operative position.

The automobile body as illustrated and designated broadly by the reference numeral 1, is substantially of the form of a well known type of touring car, and is of the form to which my improvement may be best adapted. The body is provided with the usual permanent front seat 2, and a convertible rear seat broadly designated by the numeral 3. Forming a part of the rear seat is what I term the rear seat platform 4, comprising a fixed floor board 5, disposed upon the floor proper of the body, a relatively narrow board 6 hingedly connected with the board 5, as indicated at 7, which constitutes the front side of the platform, and a seat board 8 corresponding in dimension with the floor board 5, which is hingedly connected, as at 9, with the board 6. Disposed at opposite ends of the floor board 5, and fixedly secured to the sides of the body in any suitable manner, are supporting blocks 10 for the seat board 8, same being provided on their inner sides with fixed clip irons 11 serving as a rest for the seat board when the platform sections are in seat forming position, as shown in Fig. 2. The clip irons 11 being spaced a portion of their length from the blocks jointly form elongated slots 12, adapted to receive with a snug fit metal plates 13 mortised in the ends of and fixedly secured to the seat board 8 in a manner to project beyond the surface thereof, by which means the platform sections are held in seat forming or folded relation and the body sides are held against a spreading action, thus providing a firm and non-rattling seat platform. The seat board or section 8 is provided with flange bars 14 to restrain shifting of the seat cushion 15 when disposed thereon, and clips 16 on the body sides receive hooks 17 carried on the rear side of the end cushions 18 for detachably securing said cushions in place. The end cushions and rear edge of the seat cushion bear against the back cushion 19, and the seat, end and back cushions are thus held in position in a manner which permits ready removal thereof.

The rear end of the automobile body is provided with a relatively large opening 20, and upright inwardly directed flange bars 21 for reinforcing the body at the side edges of said opening, and which also serve to form a frame or casing for the opening in conjunction with the transverse flange 22. Hingedly connected to the body, as at 23, is what I term a drop panel 24, adapted to serve as a closure for said opening 20, and also as an extension for the body upon conversion thereof from passenger to trucking purposes, as plainly shown in the drawings. Hingedly connected with the drop panel 24, and adapted to fold thereon in overlapping relation, are side members 25 movable to a vertical position, and provided with key-hole slots 25′ adapted to receive a latch bolt 26 carried by the bars 21, and thus support the drop panel in substantial alinement with the body floor, as plainly shown in Figs. 3 and 4. Also hingedly connected with the drop panel 24 is an end gate 27, foldable upon the panel for inoperative position, and having end flanges 28 which engage the inwardly bent ends 29 of the side members 25 for interlocking relation, and thus support each other against outward stresses. In order to hold the side members and end gate in operative relation, pivoted latch bars 30 carried by the side members are adapted to abut the inner side of the end gate, as shown. As shown in Figs. 2 and 3, the side members and end gate are foldable compactly upon the drop panel, and so held against movement and rattle by a slightly flexible metallic arm 31 pivotally mounted on the panel and adapted to have its free end moved to bear upon the outer side member. The drop panel may be locked in closed relation with the body by any suitable means. Preferably I employ latch plates 32 slidably mounted on the inner sides of the side flanges 33 of the panel, same having a key-hole slot 34, and headed studs 35 projecting through slots 36 in the flanges 33, to permit endwise movement of said plates. Mounted for endwise movement in bearing blocks 37 fixed to the body adjoining the bars 21, are headed latch bolts 26, normally held retracted by springs 39, which bolts are adapted to be projected through the larger open portion of the key-hole slots of the latch plates, and the latter then allowed to drop so that the smaller ends of the slots will engage the lock bolts inwardly of the headed ends thereof. Under tension of the springs the head ends of the lock bolts will be held firm against the latch plates, and by slightly tapering the key-hole slots a tight contact between the latch plates and the bolts will always be maintained, as will be obvious.

While the foregoing is the preferred form of my invention, I desire it to be understood that I do not limit myself to the precise structure shown and described, as it is obvious that the same may be variously modified without departing from the spirit of the invention.

What is claimed is:

1. A touring car body including a rear seat platform comprising hingedly connected front and seat sections adapted to be moved into substantially the same plane and for flat direct support upon the floor of the body, and means for supporting the sections in seat forming relation.

2. A touring car body including a rear seat platform comprising front and seat sections adapted for relative edgewise placement direct upon the floor of the body to provide a super floor, and means for supporting the sections in seat forming relation.

3. A touring car body including a foldable rear seat platform comprising hingedly connected front and seat sections adapted to be unfolded for direct placement upon the floor of the body in flat edge to edge position, and cushions detachably supported by the platform and car body to provide a complete upholstered rear seat.

4. A touring car body including a knockdown rear seat platform comprised of hingedly connected sections adapted for placement upon the body floor in flat position, an opening in the rear end of the body, a drop panel adapted to close said opening, and means for supporting the drop panel.

5. A touring car body including a knockdown rear seat platform adapted for placement upon the floor of the body in flat position, and the body having an opening in the rear end thereof, a drop panel adapted to close said opening, side members hingedly connected with the drop panel and foldable upon the latter, and means for locking the side members to the body to support the drop panel in open position.

6. A touring car body including a knockdown rear seat platform comprising hingedly connected sections adapted for placement upon the body floor in flat relation, the body having an opening in the rear end thereof, a drop panel hingedly supported by the body and adapted to close said opening, side members and an end gate hingedly connected with the drop panel and foldable thereon in overlapping relation, and means for locking the side members and end gate against movement when in folded relation.

7. An automobile body including a knockdown seat platform comprising a front face section and a seat section hingedly connected with each other and the body floor, oppositely disposed seat blocks fixed to the body, keepers carried by and extending inwardly of said blocks, and plates carried by the seat section adapted to engage the keepers to hold the platform sections in folded relation and to prevent spreading of the body sides.

In testimony whereof I affix my signature.

JOSEPHUS MOOMAW.